United States Patent
Kim et al.

(10) Patent No.: US 10,707,529 B2
(45) Date of Patent: Jul. 7, 2020

(54) LITHIUM SECONDARY BATTERY

(71) Applicants: Samsung Electronics Co., Ltd., Suwon-si, Gyeonggi-do (KR); Samsung SDI Co., Ltd., Yongin-si, Gyeonggi-do (KR)

(72) Inventors: Dongyoung Kim, Yongin-si (KR); Jinah Seo, Cheongju-si (KR); Hosang Park, Seoul (KR); Yoonsok Kang, Yongin-si (KR); Jungjoo Cho, Hwaseong-si (KR)

(73) Assignees: SAMSUNG ELECTRONICS CO., LTD., Gyeonggi-So (KR); SAMSUNG SDI CO., LTD., Gyeonggi-Do (KR)

( * ) Notice: Subject to any disclaimer, the term of this patent is extended or adjusted under 35 U.S.C. 154(b) by 91 days.

(21) Appl. No.: 14/982,812

(22) Filed: Dec. 29, 2015

(65) Prior Publication Data

US 2016/0190646 A1  Jun. 30, 2016

(30) Foreign Application Priority Data

Dec. 30, 2014 (KR) ......................... 10-2014-0193939

(51) Int. Cl.
| | |
|---|---|
| H01M 10/0567 | (2010.01) |
| H01M 10/052 | (2010.01) |
| H01M 4/525 | (2010.01) |
| H01M 4/505 | (2010.01) |
| H01M 4/36 | (2006.01) |
| H01M 10/0568 | (2010.01) |

(52) U.S. Cl.
CPC ....... *H01M 10/0567* (2013.01); *H01M 4/366* (2013.01); *H01M 4/505* (2013.01); *H01M 4/525* (2013.01); *H01M 10/052* (2013.01); *H01M 10/0568* (2013.01)

(58) Field of Classification Search
CPC ......... H01M 10/0567; H01M 10/0568; H01M 10/052; H01M 4/525; H01M 4/505; H01M 4/366; H01M 4/5825
See application file for complete search history.

(56) References Cited

U.S. PATENT DOCUMENTS

| | | |
|---|---|---|
| 7,102,725 B2 | 9/2006 | Moriyama |
| 7,796,236 B2 | 9/2010 | Tawaraya et al. |
| 8,399,126 B2 | 3/2013 | Matsui et al. |
| 8,415,056 B2 | 4/2013 | Koh et al. |
| 8,871,384 B2 | 10/2014 | Koh et al. |
| 2010/0047695 A1* | 2/2010 | Smart ............... H01M 10/0567 429/331 |
| 2011/0195317 A1 | 8/2011 | Koh et al. |
| 2013/0040185 A1* | 2/2013 | Takase ............. H01M 10/0569 429/145 |
| 2014/0154591 A1* | 6/2014 | Yokotsuji ............. H01M 4/386 429/341 |
| 2016/0099486 A1* | 4/2016 | Noguchi ........... H01M 10/0567 429/199 |
| 2016/0190644 A1* | 6/2016 | Takase .............. H01M 10/0567 429/341 |
| 2016/0344063 A1* | 11/2016 | Chang ............... H01M 10/0569 |

FOREIGN PATENT DOCUMENTS

| | | | |
|---|---|---|---|
| JP | 2004-095495 A | | 3/2004 |
| JP | 2004-301933 A | | 10/2004 |
| JP | 2004-301934 A | | 10/2004 |
| JP | 4416991 B2 | | 12/2009 |
| JP | 2010-086914 A | | 4/2010 |
| JP | 2010-086915 A | | 4/2010 |
| JP | 2010-123287 A | | 6/2010 |
| JP | 2010-146740 A | | 7/2010 |
| KR | 2004-0018096 A | | 3/2004 |
| KR | 2015-0006703 A | | 1/2015 |
| WO | 2008-096729 A1 | | 8/2008 |
| WO | 2010-004952 A1 | | 1/2010 |
| WO | 2010-013739 A1 | | 2/2010 |
| WO | 2010-110290 A1 | | 9/2010 |
| WO | WO 2014/181877 | * | 11/2014 |
| WO | WO 2015/046172 | * | 4/2015 |
| WO | WO-2015046172 A1 | * | 4/2015 ............ H01M 4/505 |

* cited by examiner

*Primary Examiner* — Laura Weiner

(74) *Attorney, Agent, or Firm* — Cantor Colburn LLP

(57) ABSTRACT

A lithium secondary battery including: a cathode including a high-voltage cathode active material; an anode; and an electrolyte disposed between the cathode and the anode, wherein the high-voltage cathode active material has a charge cut-off voltage of about 4.2 Volts or greater with respect to a lithium (Li) counter electrode, and wherein the electrolyte includes an organic fluorinated ether compound represented by Formula 1, an organic solvent, and a lithium salt:

$$R_1\text{—}O\text{—}CF_nH_{2-n}\text{—}R_2 \qquad \text{Formula 1}$$

wherein, in Formula 1, $R_1$ is a C1-C10 alkyl group, a C3-C10 cycloalkyl group, a C1-C10 fluorinated alkyl group, or a C3-C10 fluorinated cycloalkyl group; $R_2$ is hydrogen, fluorine, a C1-C10 alkyl group, a C3-C10 cycloalkyl group, a C1-C10 fluorinated alkyl group, or a C3-C10 fluorinated cycloalkyl group; and n is 1 or 2.

7 Claims, 4 Drawing Sheets

LITHIUM SECONDARY BATTERY

CROSS-REFERENCE TO RELATED APPLICATION

This application claims priority to and the benefit of Korean Patent Application No. 10-2014-0193939, filed on Dec. 30, 2014, in the Korean Intellectual Property Office, the content of which is incorporated herein in its entirety by reference.

BACKGROUND

1. Field

The present disclosure relates to a lithium secondary battery, and particularly, to a lithium secondary battery including a high-voltage cathode and an organic fluorinated ether compound having a specific structure.

2. Description of the Related Art

Recently, lithium secondary batteries have drawn significant attention as power sources for small portable electronic devices. Lithium batteries using an organic electrolyte have greater energy density and a discharge voltage about twice that of batteries using an aqueous alkali electrolyte.

In lithium batteries, lithium-transition metal oxides, such as $LiCoO_2$, $LiMn_2O_4$, $LiNi_{1-x}Co_xO_2$ (wherein $0<x<1$), which have a structure that allows intercalation of lithium ions, are mainly used as cathode active materials. Various forms of carbonaceous materials, including artificial graphite, natural graphite, hard carbon, silicon, or a combination thereof, which allow intercalation and deintercalation of lithium ions, have been used as anode active materials.

KR 2004-0018096 discloses an electrolyte including an organic fluorinated ether compound with a high oxidation voltage as an electrolyte solvent, and useful in a high-voltage lithium secondary battery. According to the above-identified patent document, the organic fluorinated ether compound may have a high oxidation voltage and flame retardancy and may reduce low-temperature resistance of the lithium secondary battery.

However, there still remains a need for a novel organic fluorinated ether compound with further improved performance compared to conventional organic fluorinated ether compounds.

SUMMARY

Provided is a lithium secondary battery including a high-voltage cathode and an organic fluorinated ether compound having a specific structure.

Additional aspects will be set forth in part in the description which follows and, in part, will be apparent from the description, or may be learned by practice of the presented exemplary embodiments.

According to an aspect of an exemplary embodiment, a lithium secondary battery includes:

a cathode including a high-voltage cathode active material;

an anode; and an electrolyte disposed between the cathode and the anode, wherein the high-voltage cathode active material has a charge cut-off voltage of about 4.2 Volts or greater with respect to a lithium (Li) counter electrode, and wherein the electrolyte includes an organic fluorinated ether compound represented by Formula 1, an organic solvent, and a lithium salt:

$$R_1\text{—}O\text{—}CF_nH_{2-n}\text{—}R_2 \qquad \text{Formula 1}$$

wherein, in Formula 1, $R_1$ is a C1-C10 alkyl group, a C3-C10 cycloalkyl group, a C1-C10 fluorinated alkyl group, or a C3-C10 fluorinated cycloalkyl group;

$R_2$ is hydrogen, fluorine, a C1-C10 alkyl group, a C3-C10 cycloalkyl group, a C1-C10 fluorinated alkyl group, or a C3-C10 fluorinated cycloalkyl group; and n is 1 or 2.

The high-voltage cathode active material may include $Li_{1+x}(Ni,Co,Mn)_{1-y}O_z$ (wherein $0<x\leq1$, $0\leq y<1$, and $2\leq z\leq4$), $LiM_xMn_{2-x}O_4$ (wherein M is a transition metal, and $0\leq x<2$), $LiMPO_4$ (wherein M is Mn, Co, or Ni), or a combination thereof.

The anode may have a film formed on a surface thereof, wherein the film may be derived from an organic fluorinated ether compound represented by Formula 1 as described above.

The organic fluorinated ether compound may have a boiling point of about 60° C. or higher.

The amount of the organic fluorinated ether compound may be from about 5 percent by weight to about 70 percent by weight based on a total weight of the electrolyte.

An anion of the lithium salt may include $F^-$, $Cl^-$, $Br^-$, $I^-$, $NO_3^-$, $N(CN)_2^-$, $BF_4^-$, $ClO_4^-$, $PF_6^-$, $(CF_3)_2PF_4^-$, $(CF_3)_3PF_3^-$, $(CF_3)_4PF_2^-$, $(CF_3)_5PF^-$, $(CF_3)_6P^-$, $CF_3SO_3^-$, $CF_3CF_2SO_3^-$, $(CF_3SO_2)_2N^-$, $(FSO_2)_2N^-$, $CF_3CF_2(CF_3)_2CO^-$, $(CF_3SO_2)_2CH^-$, $(SF_5)_3C^-$, $(CF_3SO_2)_3C^-$, $CF_3(CF_2)_7SO_3^-$, $CF_3CO_2^-$, $CH_3CO_2^-$, $SCN^-$, $(CF_3CF_2SO_2)_2N^-$, or a combination thereof.

A concentration of the lithium salt may be from about 0.6 moles per liter to about 2.0 moles per liter.

The organic solvent of the electrolyte may be any organic solvents in common use for electrolytes of lithium secondary batteries in the art. For example, the organic solvent may be an ether solvent, an ester solvent, an amide solvent, a linear carbonate solvent, or a cyclic carbonate solvent, which may be used alone or in combination of at least two thereof.

BRIEF DESCRIPTION OF THE DRAWINGS

These and/or other aspects will become apparent and more readily appreciated from the following description of the exemplary embodiments, taken in conjunction with the accompanying drawings in which.

DETAILED DESCRIPTION

Figure 1:
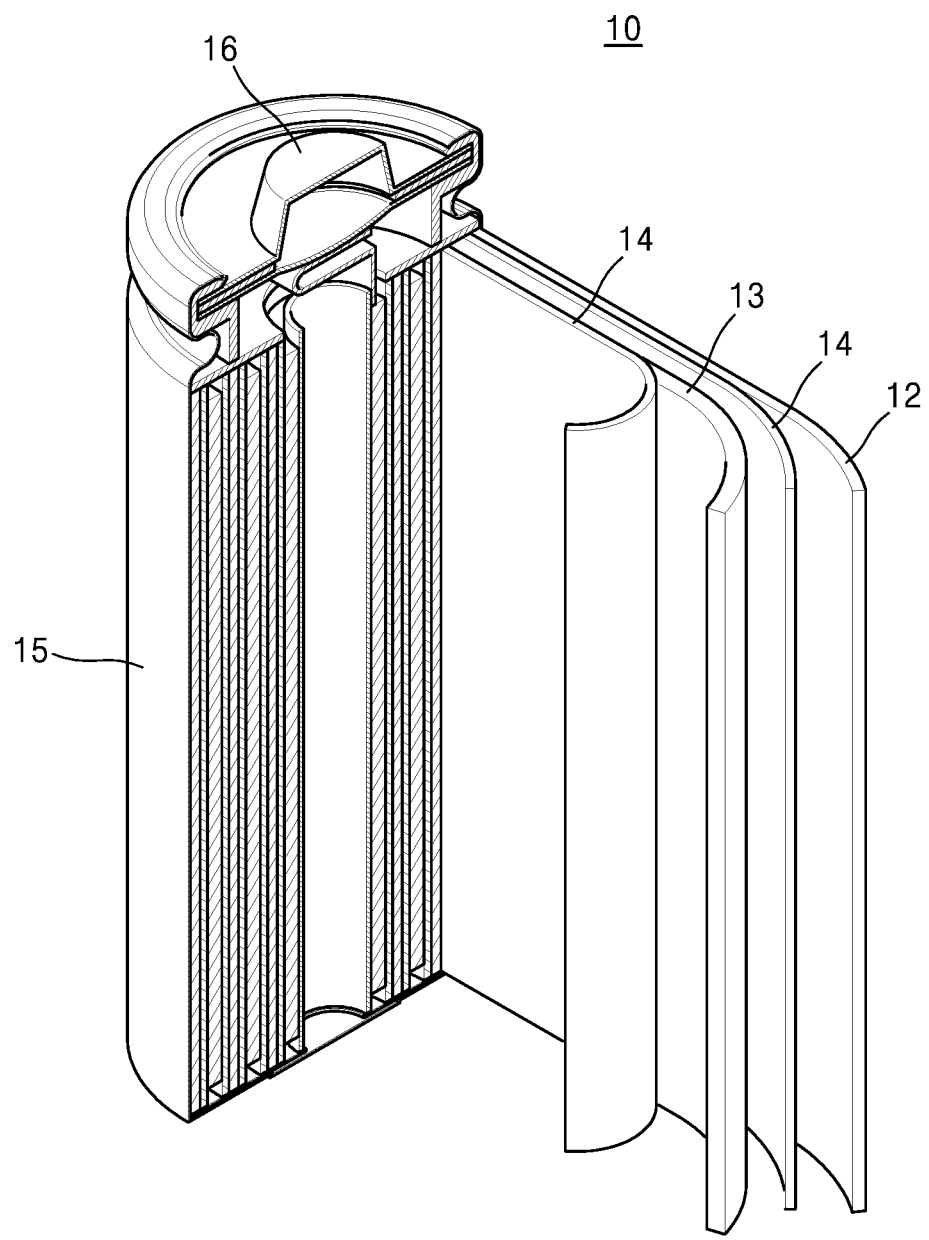
FIG. 1 is a schematic view illustrating a lithium secondary battery according to an embodiment.

Reference will now be made in detail to exemplary embodiments, examples of which are illustrated in the accompanying drawings, wherein like reference numerals refer to like elements throughout. In this regard, the present exemplary embodiments may have different forms and should not be construed as being limited to the descriptions set forth herein. Accordingly, the exemplary embodiments are merely described below, by referring to the figures, to explain aspects. As used herein, the term "and/or" includes any and all combinations of one or more of the associated listed items. Expressions such as "at least one of," when preceding a list of elements, modify the entire list of elements and do not modify the individual elements of the list.

It will be understood that when an element is referred to as being "on" another element, it can be directly in contact with the other element or intervening elements may be present therebetween. In contrast, when an element is referred to as being "directly on" another element, there are no intervening elements present.

It will be understood that, although the terms first, second, third etc. may be used herein to describe various elements, components, regions, layers, and/or sections, these elements, components, regions, layers, and/or sections should not be limited by these terms. These terms are only used to distinguish one element, component, region, layer, or section from another element, component, region, layer, or section. Thus, a first element, component, region, layer, or section discussed below could be termed a second element, component, region, layer, or section without departing from the teachings of the present embodiments.

The terminology used herein is for the purpose of describing particular embodiments only and is not intended to be limiting. As used herein, the singular forms "a," "an," and "the" are intended to include the plural forms as well, unless the context clearly indicates otherwise.

The term "or" means "and/or." It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Unless otherwise defined, all terms (including technical and scientific terms) used herein have the same meaning as commonly understood by one of ordinary skill in the art to which this general inventive concept belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10%, 5% of the stated value.

As used herein, the term "alkyl group" refers to a completely saturated, branched or unbranched (or a straight or linear) hydrocarbon group.

Non-limiting examples of the "alkyl group" include a methyl group, an ethyl group, an n-propyl group, an iso-propyl group, an n-butyl group, an iso-butyl group, a sec-butyl group, an n-pentyl group, an iso-pentyl group, a neo-pentyl group, an iso-amyl group, an n-hexyl group, a 3-methylhexyl group, a 2,2-dimethylpentyl group, a 2,3-dimethylpentyl group, and an n-heptyl group.

As used herein, the term "substituted alkyl group" refers to an alkyl group in which a hydrogen atom is substituted with a non-hydrogen substituent (a halogen atom, a C1-C6 alkyl group, a C3-C6 cycloalkyl group, a C1-C6 alkoxy group, a C6-C10 aryl group, an oxygen atom, a sulfur atom, a nitrogen atom, and the like).

As used herein, the term "fluorinated alkyl group" refers to an alkyl group in which at least one hydrogen atom is substituted with a fluorine atom.

As used herein, the term "substituted fluorinated alkyl group" refers to a fluorinated alkyl group in which a hydrogen atom is substituted with a non-hydrogen substituent (a halogen atom, a C1-C6 alkyl group, a C3-C6 cycloalkyl group, a C1-C3 alkoxy group, a C6-C10 aryl group, an oxygen atom, a sulfur atom, a nitrogen atom, and the like).

As used herein, the term "cycloalkyl group" refers to a monovalent group having one or more saturated and/or partially saturated rings in which all ring members are carbon.

Non-limiting examples of the "cycloalkyl group" include a cyclopropyl group, a cyclopropylmethyl group, a cyclobutyl group, a cyclobutyl group, a cyclopentyl group, a cyclopentenyl group, a cyclohexyl group, a cyclohexenyl group, a cycloheptyl group, a cycloheptenyl group, a cyclooctyl group, a cyclooctenyl group, and an adamantyl group.

As used herein, the term "substituted cycloalkyl group" refers to a cycloalkyl group in which a hydrogen atom is substituted with a non-hydrogen substituent (a halogen atom, a C1-C6 alkyl group, a C3-C6 cycloalkyl group, a C1-C6 alkoxy group, a C6-C10 aryl group, an oxygen atom, a sulfur atom, a nitrogen atom, and the like).

As used herein, the term "fluorinated cycloalkyl group" refers to a cycloalkyl group in which at least one hydrogen atom is substituted with a fluorine atom.

As used herein, the term "substituted fluorinated cycloalkyl group" refers to a fluorinated cycloalkyl group in which a hydrogen atom is substituted with a non-hydrogen substituent (a halogen atom, a C1-6 alkyl group, a C3-C6 cycloalkyl group, a C1-C6 alkoxy group, a C6-C10 aryl group, an oxygen atom, a sulfur atom, a nitrogen atom, and the like).

As used herein, the term "aryl group" refers to a group having at least one aromatic ring in which all ring members are carbon.

Non-limiting examples of the "aryl group" include a phenyl group and a naphthyl group.

When a group containing a specified number of carbon atoms is substituted with any of the groups listed in the preceding paragraphs, the number of carbon atoms in the resulting "substituted" group is defined as the sum of the carbon atoms contained in the original (unsubstituted) group and the carbon atoms (if any) contained in the substituent. For example, a C1-C10 alkyl group substituted with an aryl group has a total of 7 to 20 carbon atoms.

As used herein, the term "halogen atom" refers to a fluorine atom, a bromine atom, a chlorine atom, or an iodine atom.

As used herein, the term "discharging" refers to a deintercalation process of lithium ions from an anode, and the term "charging" refers to an intercalation process of lithium ions into the anode.

As used herein, the term "charge cut-off voltage" refers to a potential difference between a cathode and an anode at the point when a cut-off is occurred, wherein a charge cut-off voltage may be set to prevent oxidation of electrolyte at high voltage.

Hereinafter, embodiments of a lithium secondary battery will be described in greater detail.

According to an aspect of the present disclosure, a lithium secondary battery includes a cathode including a high-voltage cathode active material, an anode, and an electrolyte disposed between the cathode and the anode.

The high-voltage cathode active material may be a material that allows reversible intercalation and deintercalation of lithium ions.

For example, the high-voltage cathode active material may have a charge cut-off voltage of about 4.2 Volts (V) or greater, about 4.3 V or greater, about 4.4 V or greater, about 4.5 V or greater, about 4.6 V or greater, about 4.7 V or greater, about 4.8 V or greater, about 4.9 V or greater, about 5.0 V or greater, about 5.1 V or greater, about 5.2 V or greater, about 5.3 V or greater, about 5.4 V or greater, or about 5.5 V or greater, with respect to lithium (Li) counter electrode. For example, the high-voltage cathode active material may also have a charge cut-off voltage of about 10 V or less with respect to Li counter electrode.

In some embodiments, the high-voltage cathode active material may include $Li_{1+x}(Ni,Co,Mn)_{1-y}O_z$ (wherein $0<x\leq 1$, $0\leq y<1$, and $2\leq z\leq 4$), $LiM_xMn_{2-x}O_4$ (wherein M is a transition metal, and $0\leq x<2$), $LiMPO_4$ (wherein M is Mn, Co, or Ni), or a combination thereof. For example, the high-voltage cathode active material may include $Li_{1.2}Ni_{0.13}Co_{0.13}Mn_{0.54}O_2$. However, the high-voltage cathode active material is not limited to the above-listed materials, and may include other cathode active materials having a charge cut-off voltage of about 4.2 V or greater with respect to Li counter electrode.

Such a high-voltage cathode active material as listed above may have a coating layer on a surface thereof. The coating layer may include at least one compound of a coating element selected from oxide of a coating element, hydroxide of a coating element, oxyhydroxide of a coating element, oxycarbonate of a coating element, hydroxycarbonate of a coating element, or a combination thereof. The compounds constituting the coating layer may be amorphous or crystalline. The coating element for the coating layer may be magnesium (Mg), aluminum (Al), cobalt (Co), potassium (K), sodium (Na), calcium (Ca), silicon (Si), titanium (Ti), vanadium (V), tin (Sn), germanium (Ge), gallium (Ga), boron (B), arsenic (As), zirconium (Zr), or a combination thereof. The coating layer may be formed using any methods, for example, spray coating or dipping, known in the art.

In some embodiments, the anode may include an anode active material that allows reversible intercalation and deintercalation of lithium ions. For example, the anode active material may include a lithium metal, a lithium metal alloy, a transition metal oxide, a material that allows doping or undoping of lithium, a material that allows reversible intercalation and deintercalation of lithium ions, or a combination thereof.

The lithium metal alloy may be an alloy of lithium with a metal selected from sodium (Na), potassium (K), rubidium (Rb), cesium (Cs), francium (Fr), beryllium (Be), magnesium (Mg), calcium (Ca), strontium (Sr), silicon (Si), antimony (Sb), lead (Pb), indium (In), zinc (Zn), barium (Ba), radium (Ra), germanium (Ge), aluminum (Al), and tin (Sn).

The transition metal oxide may include a tungsten oxide, a molybdenum oxide, a titanium oxide, a lithium titanium oxide, a vanadium oxide, a lithium vanadium oxide, or a combination thereof.

Examples of the material that allows doping or undoping of lithium are Si, Sn, Al, Ge, Pb, Bi, Sb, a Si-$M^j$ alloy (wherein $M^j$ is an alkali metal, an alkali earth metal, a Group 11 element, a Group 12 element, a Group 13 element, a Group 14 element, a Group 15 element, a Group 16 element, a transition metal, a rare earth element, or a combination thereof, except for Si), a Sn-$M^k$ alloy (wherein $M^k$ is an alkali metal, an alkali earth metal, a Group 11 element, a Group 12 element, a Group 13 element, a Group 14 element, a Group 15 element, a Group 16 element, a transition metal, a rare earth element, or a combination thereof, except for Sn), or a combination thereof. For example, $M^j$ and $M^k$ may be each independently magnesium (Mg), calcium (Ca), strontium (Sr), barium (Ba), radium (Ra), scandium (Sc), yttrium (Y), titanium (Ti), zirconium (Zr), hafnium (Hf), rutherfordium (Rf), vanadium (V), niobium (Nb), tantalum (Ta), dubnium (Db), chromium (Cr), molybdenum (Mo), tungsten (W), seaborgium (Sg), technetium (Tc), rhenium (Re), bohrium (Bh), iron (Fe), lead (Pb), ruthenium (Ru), osmium (Os), hassium (Hs), rhodium (Rh), iridium (Ir), palladium (Pd), platinum (Pt), copper (Cu), silver (Ag), gold (Au), zinc (Zn), cadmium (Cd), boron (B), aluminum (Al), gallium (Ga), tin (Sn), indium (In), titanium (Ti), germanium (Ge), phosphorus (P), arsenic (As), antimony (Sb), bismuth (Bi), sulfur (S), selenium (Se), tellurium (Te), polonium (Po), or a combination thereof.

The material that allows reversible intercalation and deintercalation of lithium ions may be any carbonaceous anode active materials that are commonly used in a lithium ion battery. Examples of such carbonaceous materials are crystalline carbon, amorphous carbon, or a combination thereof. For example, the crystalline carbon may be natural graphite, artificial graphite, expanded graphite, graphene, fullerene soot, carbon nanotubes, carbon fibers, or a combination thereof. For example, the amorphous carbon may be soft carbon (carbon sintered at low temperatures), hard carbon, meso-phase pitch carbides, sintered corks, or a combination thereof. The carbonaceous anode active material may be in, for example, spherical, planar, fibrous, tubular, or powder form.

In some embodiments, the anode may include at least one anode active material selected from a vanadium oxide, a lithium vanadium oxide, silicon (Si), $SiO_x$ (wherein $0<x<2$), a Si-$M^r$ alloy (wherein $M^r$ is magnesium (Mg), calcium (Ca), strontium (Sr), barium (Ba), radium (Ra), scandium (Sc), yttrium (Y), titanium (Ti), zirconium (Zr), hafnium (Hf), rutherfordium (Rf), vanadium (V), niobium (Nb), tantalum (Ta), dubnium (Db), chromium (Cr), molybdenum (Mo), tungsten (W), seaborgium (Sg), technetium (Tc), rhenium (Re), bohrium (Bh), iron (Fe), lead (Pb), ruthenium (Ru), osmium (Os), hassium (Hs), rhodium (Rh), iridium (Ir), palladium (Pd), platinum (Pt), copper (Cu), silver (Ag), gold (Au), zinc (Zn), cadmium (Cd), boron (B), aluminum (Al), gallium (Ga), tin (Sn), indium (In), titanium (Ti), germanium (Ge), phosphorus (P), arsenic (As), antimony (Sb), bismuth (Bi), sulfur (S), selenium (Se), tellurium (Te), polonium (Po), or combinations thereof), graphite, soft carbon, hard carbon, mesophase pitch carbide, and sintered coke.

In some embodiments, the electrolyte of the lithium secondary battery may include a organic fluorinated ether compound represented by Formula 1, an organic solvent, and a lithium salt:

$$R_1-O-CF_nH_{2-n}-R_2 \quad \text{Formula 1}$$

In Formula 1, $R_1$ may be a substituted or unsubstituted C1-C10 alkyl group, a C1-C10 cycloalkyl group, a substituted or unsubstituted C1-C10 fluorinated alkyl group, or a substituted or unsubstituted C3-C10 fluorinated cycloalkyl group;

$R_2$ may be hydrogen, fluorine, a substituted or unsubstituted C1-C10 alkyl group, a C1-C10 cycloalkyl group, a substituted or unsubstituted C1-C10 fluorinated alkyl group, or a substituted or unsubstituted C3-C10 fluorinated cycloalkyl group; and n may be 1 or 2.

Due to suppressed decomposition at high voltage of the organic fluorinated ether compound, a lithium secondary battery including the organic fluorinated ether compound as an electrolyte ingredient (for example, an electrolyte solvent) may have improved lifetime.

The organic fluorinated ether compound is added to the electrolyte to be subjected to decomposition reaction on a surface of an anode during initial charging of the lithium secondary battery and form a stable solid electrolyte interface (SEI) membrane at an interface between the anode and the electrolyte, and thus may improve stability of the lithium secondary battery. Since the organic fluorinated ether compound forms the SEI membrane on the surface of the anode, the amount of the organic fluorinated ether compound in the electrolyte may be decreased with increased operation time of the lithium secondary battery.

The SEI membrane on the surface of the anode may have a thickness of about 0.05 nanometers (nm) to about 100 nm. For example, the SEI membrane may have a thickness of about 0.1 nm to about 80 nm, and in some embodiments, about 0.5 nm to about 50 nm. While not wishing to be bound by theory, it is understood that when the thickness of the SEI membrane is within any of these ranges (about 0.05 nm to about 100 nm), the SEI membrane may not adversely affect the migration of lithium ions and may effectively prevent oxidation of the electrolyte on the surface of the anode.

For example, the organic fluorinated ether compound represented by Formula 1 may be:

i) a material with n=1 in Formula 1, wherein the total number of fluorine atoms bound to the $2^{nd}$ carbon atom from oxygen (O) of both $R_1$ and $R_2$ is 3 to 6, ii) a material with n=2 in Formula 1, wherein the total number of fluorine atoms bound to the $2^{nd}$ carbon atom from oxygen (O) of both $R_1$ and $R_2$ is 1 to 6, iii) a material with n=1 in Formula 1, wherein one fluorine atom is bound to the $1^{st}$ carbon atom from oxygen (O) of $R_1$, iv) a material with n=2 in Formula 1, wherein one fluorine atom is bound to the $1^{st}$ carbon atom from oxygen (O) of $R_1$, or v) a material with n=2 in Formula 1, wherein the number of fluorine atoms bound to the $1^{st}$ carbon atom from oxygen (O) of $R_1$ is 2.

In some embodiments when n=1, no fluorine atom is bound to a $1^{st}$ carbon atom from oxygen (O) of $R_1$; or one fluorine atom is bound to a $1^{st}$ carbon atom from oxygen (O) of $R_1$; or two fluorine atoms are bound to a $1^{st}$ carbon atom from oxygen (O) of $R_1$.

The inventors of the present disclosure searched for an optimal fluorine position in an organic fluorinate ether compound to effectively increase an oxidation potential of the organic fluorinated ether. The optimal fluorine position to increase an oxidation potential of the organic fluorinated ether compound is the position at which a fluorine atom is bound to the $1^{st}$ carbon atom from oxygen (O) of $R_1$ in the organic fluorinated ether compound. The further a carbon with fluorine bound thereto is away from oxygen (O) in the organic fluorinated ether compound, the less likely it is to effectively raise the oxidation potential of the organic fluorinated ether compound. For example, when one fluorine is bound to the $1^{st}$ carbon atom from oxygen (O) of the organic fluorinated ether compound, the total number of fluorine atoms bound to the $2^{nd}$ carbon atoms from oxygen (O) of $R_1$ and $R_2$ may be 3, 4, 5, or 6 to provide the organic fluorinated ether compound with an appropriate oxidation potential for use as a component of a high-voltage electrolyte. In some embodiments, when two fluorines are bound to the $1^{st}$ carbon atom from oxygen (O) in the organic fluorinated ether compound, but the two fluorine atoms are both bound to one carbon atom, the total number of fluorine atoms bound to the $2^{nd}$ carbon atom from oxygen (O) of $R_1$ and $R_2$ may be 1, 2, 3, 4, 5, or 6 to provide the organic fluorinated ether compound with an appropriate oxidation potential for use as a component of a high-voltage electrolyte. In some other embodiments, when two fluorines are bound to the $1^{st}$ carbon(s) nearest to oxygen (O) of $R_1$ and $R_2$ in the organic fluorinated ether compound, one fluorine atom may be bound to a carbon and the other fluorine to another carbon, the organic fluorinated ether compound may have an appropriate oxidation potential for use as a component of a high-voltage electrolyte. In some other embodiments, when three or four fluorine atoms are bound to the $1^{st}$ carbon atom from oxygen (O) in the organic fluorinated ether compound, the organic fluorinated ether compound may have an appropriate oxidation potential for use as a component of a high-voltage electrolyte. The materials listed above as examples of the organic fluorinated ether compound may include fluorine at optimal position to have high oxidation stability and thus may be appropriate for use as a component of a high-voltage electrolyte.

The organic fluorinated ether compound of Formula 1 may include at least one of compounds represented by Formulae 2 to 14:

Formula 2
$$R_{11}-CF_2-CH_2-O-CFH-CFH-R_{12}$$
Formula 3
$$R_{11}-CFH-CH_2-O-CFH-CF_2-R_{12}$$
Formula 4
$$R_{11}-CF_2-CH_2-O-CFH-CF_2-R_{12}$$
Formula 5
$$CF_3-CH_2-O-CFH-CFH-R_{12}$$
Formula 6
$$R_{11}-CF_2-CH_2-O-CFH-CF_3$$
Formula 7
$$CF_3-CH_2-O-CFH-CF_2-R_{12}$$
Formula 8
$$R_{21}-CH_2-O-CF_2-CFH-R_{12}$$
Formula 9
$$R_{21}-CH_2-O-CF_2-CF_2-R_{12}$$

-continued

Formula 10
$R_{11}$—CFH—CH$_2$—O—CF$_2$—$R_{22}$
Formula 11
$R_{11}$—CF$_2$—CH$_2$—O—CF$_2$—$R_{22}$
Formula 12
$R_{21}$—CFH—O—CFH—$R_{22}$
Formula 13
$R_{21}$—CFH—O—CF$_2$—$R_{22}$
Formula 14
$R_{21}$—CF$_2$—O—CF$_2$—$R_{22}$ In Formulae 2 to 14, $R_{11}$ may be hydrogen, fluorine, a substituted or unsubstituted C1-C8 alkyl group, a substituted or unsubstituted C3-C8 cycloalkyl group, a substituted or unsubstituted C1-C8 fluorinated alkyl group, or a substituted or unsubstituted C3-C8 fluorinated cycloalkyl group;

$R_{21}$ may be hydrogen, fluorine, a substituted or unsubstituted C1-C9 alkyl group, a substituted or unsubstituted C3-C9 cycloalkyl group, a substituted or unsubstituted C1-C9 fluorinated alkyl group, or a substituted or unsubstituted C3-C9 fluorinated cycloalkyl group;

$R_{12}$ may be hydrogen, fluorine, a substituted or unsubstituted C1-C9 alkyl group, a substituted or unsubstituted C3-C9 cycloalkyl group, a substituted or unsubstituted C1-C9 fluorinated alkyl group, or a substituted or unsubstituted C3-C9 fluorinated cycloalkyl group; and $R_{22}$ may be hydrogen, fluorine, a substituted or unsubstituted C1-C10 alkyl group, a substituted or unsubstituted C3-C10 cycloalkyl group, a substituted or unsubstituted C1-C10 fluorinated alkyl group, or a substituted or unsubstituted C3-C10 fluorinated cycloalkyl group.

The organic fluorinated ether compound may have a boiling point of about 60° C. or greater. While not wishing to be bound by theory, it is understood that when the organic fluorinated ether compound has a boiling point within this range, gasification of the organic fluorinated ether compound during operation of the lithium secondary battery may be prevented.

The amount of the organic fluorinated ether compound may be from about 5 percent by weight (wt %) to about 70 wt % based on a total weight of the electrolyte. While not wishing to be bound by theory, it is understood that when the amount of the organic fluorinated ether compound is within this range, a lithium secondary battery with improved capacity and lifetime characteristics and reduced low-temperature resistance may be obtained.

A concentration of the lithium salt may be from about 0.6 M to about 2.0 M, and in some embodiments, from about 0.7 M to about 1.6 M. When the concentration of the lithium salt is within these ranges (0.6 M-2.0 M), the electrolyte may have improved performance due to high conductivity and may have improved mobility of lithium ions due to an appropriate viscosity. The lithium salt may be any lithium salts in common use for electrolytes of lithium secondary batteries in the art. For example, an anion of the lithium salt may be $F^-$, $Cl^-$, $Br^-$, $I^-$, $NO_3^-$, $N(CN)_2^-$, $BF_4^-$, $ClO_4^-$, $PF_6^-$, $(CF_3)_2PF_4^-$, $(CF_3)_3PF_3^-$, $(CF_3)_4PF_2^-$, $(CF_3)_5PF^-$, $(CF_3)_6P^-$, $CF_3SO_3^-$, $CF_3CF_2SO_3^-$, $(CF_3SO_2)_2N^-$, $(FSO_2)_2N^-$, $CF_3CF_2(CF_3)_2CO^-$, $(CF_3SO_2)_2CH^-$, $(SF_5)_3C^-$, $(CF_3SO_2)_3C^-$, $CF_3(CF_2)_7SO_3^-$, $CF_3CO_2^-$, $CH_3CO_2^-$, $SCN^-$, $(CF_3CF_2SO_2)_2N^-$, or a combination thereof.

The organic solvent of the electrolyte may be any organic solvent in common used for electrolytes of lithium secondary batteries in the art. For example, the organic solvent may be an ether solvent, an ester solvent, an amide solvent, a linear carbonate solvent, or a cyclic carbonate solvent, which may be used alone or in combination of at least two thereof.

A representative example of the organic solvent of the electrolyte may include a cyclic carbonate solvent, a linear carbonate solvent, or a combination thereof. Non-limiting examples of the cyclic carbonate solvent include ethylene carbonate (EC), propylene carbonate (PC), 1,2-butylene carbonate, 2,3-butylene carbonate, 1,2-pentylene carbonate, 2,3-pentylene carbonate, vinylene carbonate, a halide thereof, or a combination thereof. Non-limiting examples of the linear carbonate solvent include dimethyl carbonate (DMC), diethyl carbonate (DEC), dipropyl carbonate, ethyl methyl carbonate (EMC), methyl propyl carbonate, ethyl propyl carbonate, or a combination thereof.

Ethylene carbonate (EC) and propylene carbonate (PC), as examples of cyclic carbonate solvents available as the organic solvent of the electrolyte, are high-viscosity organic solvents with a high dielectric constant, which may facilitate dissociation of the lithium salt in the electrolyte. Such a cyclic carbonate may be mixed with a linear carbonate, such as dimethyl carbonate (DMC) and diethyl carbonate (DEC), having low viscosity and low dielectric constant in an appropriate ratio to prepare an electrolyte having high electric conductivity.

Non-limiting examples of the ether solvent available as the organic solvent include dimethyl ether, diethyl ether, dipropyl ether, methyl ethyl ether, methyl propyl ether, ethyl propyl ether, or a combination thereof.

Non-limiting examples of the ester solvent available as the organic solvent include methyl acetate, ethyl acetate, propyl acetate, methyl propionate, ethyl propionate, propyl propionate, γ-butyrolactone, γ-valerolactone, γ-caprolactone, σ-valerolactone, ε-caprolactone, or a combination thereof.

The electrolyte for a lithium secondary battery may further include a conventional additive to form a solid electrolyte interface (SEI) membrane within the scope of the objective of the present inventive concept. Non-limiting examples of the additive to form the SEI membrane include vinylene carbonate, vinyl ethylene carbonate, fluoroethylene carbonate, a cyclic sulfite, a saturated sultone, an unsaturated sultone, an acyclic sulfone, or a combination thereof.

Non-limiting examples of the cyclic sulfite may include ethylene sulfite, methyl ethylene sulfite, ethyl ethylene sulfite, 4,5-dimethyl ethylene sulfite, 4,5-diethyl ethylene sulfite, propylene sulfite, 4,5-dimethyl propylene sulfite, 4,5-diethyl propylene sulfite, 4,6-dimethyl propylene sulfite, 4,6-diethyl propylene sulfite, 1,3-butylene glycol sulfite, or a combination thereof. Non-limiting examples of the saturated sultone may include 1,3-propane sultone, 1,4-butane sultone, or a combination thereof. Non-limiting examples of the unsaturated sultone may include ethene sultone, 1,3-propene sultone, 1,4-butene sultone, 1-methyl-1,3-propene sultone, or a combination thereof. Non-limiting examples of the acyclic sulfone may include divinyl sulfone, dimethyl sulfone, diethyl sulfone, methylethyl sulfone, methylvinyl sulfone, or a combination thereof.

The amount of the additive to form an SEI membrane may be appropriately chosen according to a type of the additive. For example, the amount of the additive to form an SEI membrane may be from about 0.01 parts by weight to about 10 parts by weight, for example, from about 0.01 parts by weight to about 5 parts by weight based on a total weight of the electrolyte for a lithium secondary battery.

A lithium secondary battery according to any of the above-described embodiments may be manufactured using any methods known in the art.

Due to the inclusion of an organic fluorinated ether compound, which is durable against decomposition under high voltage, in the electrolyte, the lithium secondary battery may have improved capacity and lifetime characteristics and reduced low-temperature resistance.

FIG. 1 is a schematic view illustrating a lithium secondary battery 10 according to an embodiment.

Referring to FIG. 1, the lithium secondary battery 10 may include a cathode 13, an anode 11, and a separator 12.

The cathode 13, the anode 11, and the separator 12 may be rolled or folded, and may be subsequently accommodated in a battery case 14, followed by injecting an electrolyte (not shown) into the battery case 14 and sealing with a cap assembly 15, thereby completing manufacture of the lithium secondary battery 10. The battery case 14 may be a cylindrical, rectangular, or thin-film type. For example, the lithium secondary battery 10 may be a large thin-film battery.

One or more embodiments of the present disclosure will now be described in detail with reference to the following examples. However, these examples are only for illustrative purposes and are not intended to limit the scope of the one or more embodiments of the present disclosure.

Examples 1 to 7

Preparation of Electrolytes

Fluoroethylene carbonate (FEC), dimethylcarbonate (DMC), an organic fluorinated ether compound, and $LiPF_6$ as a lithium salt were mixed together to obtain an electrolyte containing 1.3 molar (M) of $LiPF_6$. The types of organic fluorinated ether compounds used in Examples 1 to 7 are represented in Table 1. The compositions of the electrolytes used in Examples 1 to 7 are also represented in Table 2.

TABLE 1

| Example | Types of organic fluorinated ether compounds |
| --- | --- |
| Example 1 | 1H,1H,5H-perfluoropentyl-1,1,2,2-tetrafluoroethylether |
| Example 2 | propyl 1,1,2,2-tetrafluoroethylether |
| Example 3 | 1,1,2,3,3,3-hexafluoropropylethylether |
| Example 4 | 1,1,2,2-tetrafluoroethyl 2,2,3,3-tetrafluoropropylether |
| Example 5 | 1,1,2,3,3,3-hexafluoropropyl 2,2,2-trifluoroethylether |
| Example 6 | 1H,1H,2'H,3H-decafluorodipropylether |
| Example 7 | 1H,1H,2'H-perfluorodipropylether |

TABLE 2

| | Composition of Electrolyte | | | |
| --- | --- | --- | --- | --- |
| | FEC (wt %) | DMC (wt %) | Organic fluorinated ether compound (wt %) | $LiPF_6$ (wt %) |
| Example 1 | 14 | 31 | 42 | 13 |
| Example 2 | 17 | 35 | 33 | 15 |
| Example 3 | 16 | 33 | 37 | 14 |
| Example 4 | 15 | 32 | 40 | 13 |
| Example 5 | 15 | 32 | 40 | 13 |
| Example 6 | 15 | 32 | 40 | 13 |
| Example 7 | 15 | 31 | 41 | 13 |

Manufacture of Cylindrical Cell and Coin Cell $Li_{1.2}Ni_{0.13}Co_{0.13}Mn_{0.54}O_2$ (OLO) as a cathode active material, polyvinylidene fluoride (PVDF) as a binder, and Denka black as a conducting agent were mixed in a weight ratio of about 92:4:4 to obtain a solid mixture. This solid mixture was dispersed in N-methyl-2-pyrrolidone to prepare a cathode active material layer composition. The cathode active material layer composition was coated on an aluminum foil having a thickness of about 15 micrometers (μm), dried in an oven set at about 90° C. for about 2 hours, and then further dried in a vacuum oven at about 120° C. for about 2 hours to completely evaporate the solvent. The resulting product was then pressed and punched, thereby manufacturing a cathode.

The cathode, a silicon anode (manufactured using a silicon-carbon composite anode active material according to Korean Patent Application 2013-0080493), a polypropylene separator (available from Teijin Co., Ltd.), and the electrolyte prepared in Example 1 as described above were used to manufacture a 18650 cylindrical cell and a 2032 coin cell.

Comparative Example 1

Preparation of Electrolyte 22 percent by weight (wt %) of fluoroethylene carbonate (FEC), 43 wt % of diethyl carbonate (DEC), 20 wt % of ethylene carbonate (EC), and 15 wt % of $LiPF_6$ as a lithium salt were mixed to prepare an electrolyte containing 1.3 M of $LiPF_6$.

Manufacture of Cylindrical Cell and Coin Cell

A cylindrical cell and a coin cell were manufactured in the same manner as in Example 1, except that the electrolyte prepared in Comparative Example 1 as described above, instead of the electrolyte of Example 1, was used.

Evaluation Example 1: Evaluation of Specific Capacity and Capacity Retention

A charge-discharge test was performed on the cylindrical cells of Example 1 and Comparative Example 1 in the following manner.

First, each of the cylindrical cells was charged at about 25° C. with a constant current of about 0.05 Coulomb (C) to a voltage of about 4.55 V, and then discharged with a constant current of about 0.05 C to a discharge voltage of about 2.0 V (First cycle of formation process).

Next, each of the cylindrical cells was charged at about 25° C. with a constant current of about 0.1 C to a voltage of about 4.55 V, and then discharged with a constant current of about 0.1 C to a discharge voltage of about 2.0 V (Second cycle of formation process). This cycle was repeated one more (Third cycle of formation process).

The cylindrical cell after the formation processes was charged at about 25° C. with a constant current of about 1 C to a voltage of about 4.55 V, and then discharged with a constant current of about 1 C to a discharge voltage of about 2.0 V, followed by discharge capacity measurement. This discharge capacity was recorded as a $1^{st}$ cycle discharge capacity or an initial capacity. This charge and discharge cycle was repeated 100 times.

A discharge capacity measured at every cycle was recorded as a specific capacity. The results are shown in FIG. 2.

Figure 2:
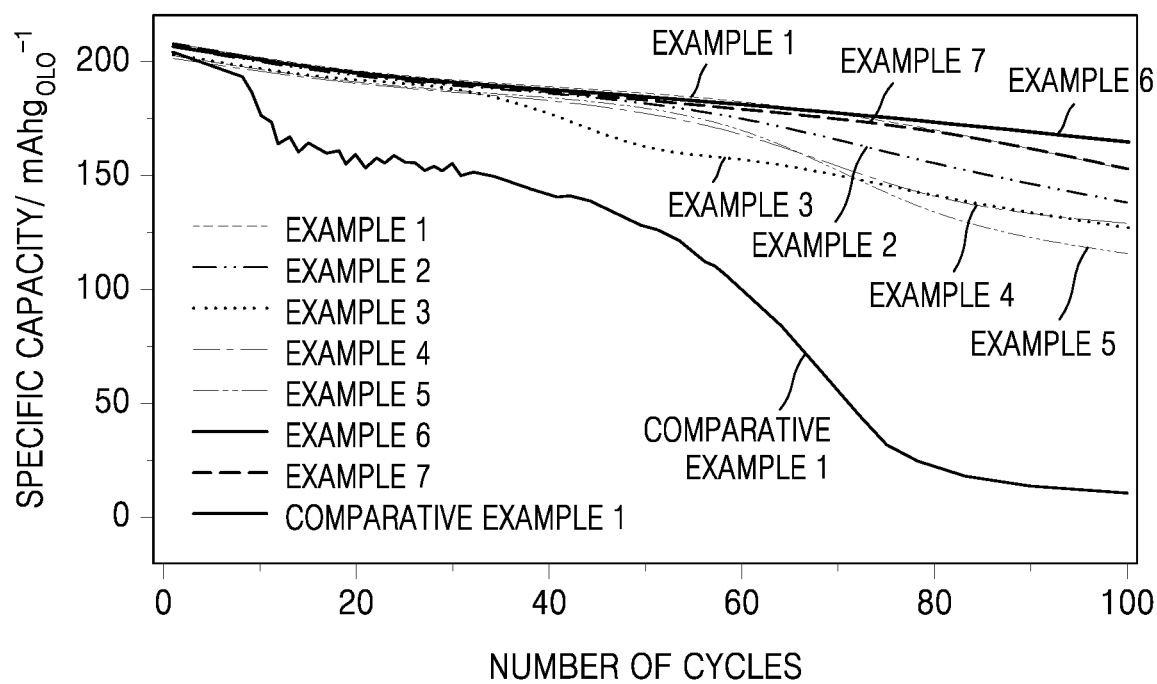
FIG. 2 is a graph of specific capacity (milliampere hours per gram, mA·h/g) versus number of cycles, illustrating specific capacity characteristics of cylindrical cells of Examples 1 to 7 and Comparative Example 1.

Referring to FIG. 2, the cylindrical cell of Example 1 was found to have a smaller width of decrease in specific capacity with respect to the number of cycles, compared to the cylindrical cell of Comparative Example 1.

A capacity retention of each cylindrical cell was calculated based on the discharge capacity measured at each cycle using Equation 1. The specific capacities and capacity retentions at 100$^{th}$ cycle of the cylindrical cells of Examples 1 to 7 and Comparative Example 1 are represented in Table 3.

Capacity retention (%)=(100$^{th}$-cycle discharge capacity/1$^{st}$-cycle discharge capacity)×100   Equation 1

TABLE 3

| Example | Specific capacity (mA · hg$^{-1}$) @100$^{th}$ cycle | Capacity retention (%) @100$^{th}$ cycle |
|---|---|---|
| Example 1 | 151.0 | 73.5 |
| Example 2 | 137.0 | 67.3 |
| Example 3 | 126.0 | 61.8 |
| Example 4 | 128.2 | 63.7 |
| Example 5 | 114.7 | 56.7 |
| Example 6 | 163.0 | 80.0 |
| Example 7 | 151.3 | 73.5 |
| Comparative Example 1 | 10.8 | 5.3 |

Referring to Table 3, the cylindrical cells of Examples 1 to 7 were found to have a higher specific capacity and a higher capacity retention at 100$^{th}$ cycle compared to those of the cylindrical cell of Comparative Example 1.

Evaluation Example 2: Low-Temperature Resistance Evaluation

Figure 3:
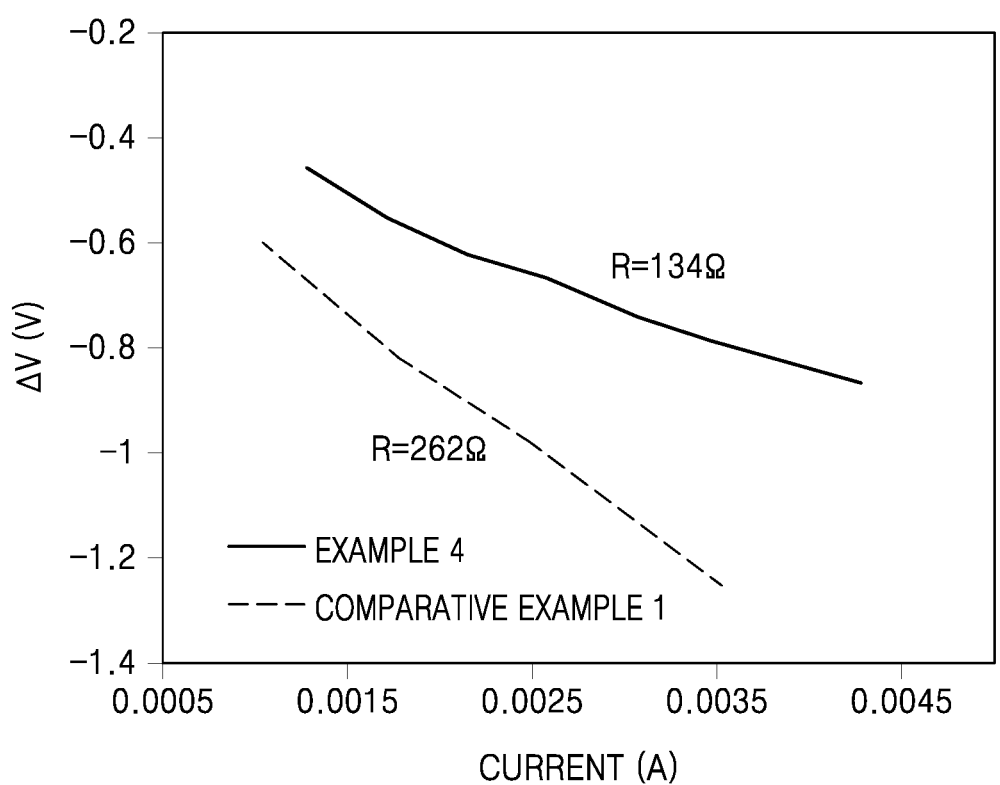
FIG. 3 is a graph of voltage drop (volts, V) versus current (amperes, A), illustrating low-temperature resistance characteristics in coin cells of Example 4 and Comparative Example 1.
Figure 4:
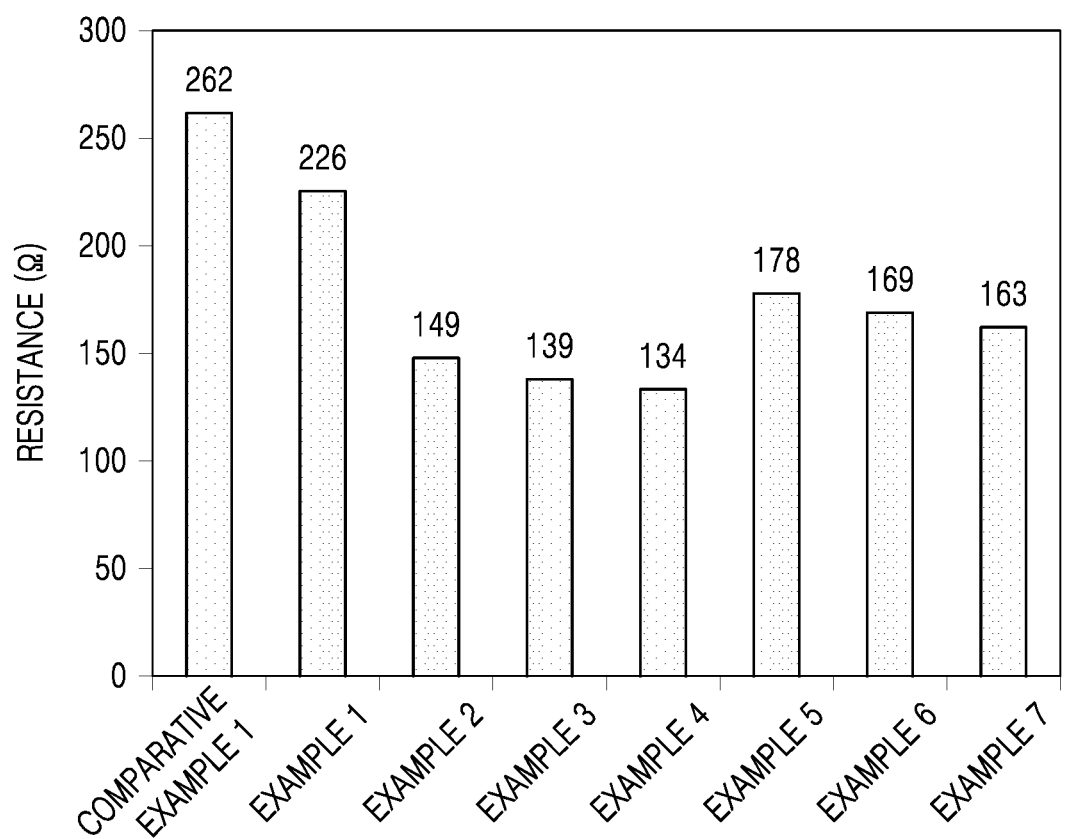
FIG. 4 is a diagram showing low-temperature resistance (Ohm, Ω) of coin cells of Examples 1 to 7 and Comparative Example 1.

A charge-discharge test was performed at −25° C. on the coin cells of Examples 1 to 7 and Comparative Example 1 with varying C-rate. A voltage drop (ΔV) at each C-rate was measured. The results are shown in FIGS. 3 and 4. An average slope in a graph of voltage drop with respect to current in FIG. 3 was calculated and recorded as a low-temperature resistance. As used herein, the term "C-rate" as a discharge rate of a coin cell refers to a value obtained by dividing a total discharge capacity of the coin cell by a total discharge time of the coin cell.

Referring to FIGS. 3 and 4, the coin cells of Examples 1 to 7 were found to have a significantly smaller low-temperature resistance compared to that of the coin cell of Comparative Example 1, indicating that the coin cells of Examples 1 to 7 have improved low-temperature output characteristics compared to the coin cell of Comparative Example 1.

As described above, according to the one or more embodiments, a lithium secondary battery including a high-voltage cathode active material and an organic fluorinated ether compound of Formula 1 may have improved capacity characteristics and lifetime characteristics and reduced low-temperature resistance.

It should be understood that exemplary embodiments described herein should be considered in a descriptive sense only and not for purposes of limitation. Descriptions of features or aspects within each exemplary embodiment should typically be considered as available for other similar features or aspects in other exemplary embodiments.

While one or more exemplary embodiments have been described with reference to the figures, it will be understood by those of ordinary skill in the art that various changes in form and details may be made therein without departing from the spirit and scope of the present inventive concept as defined by the following claims.

What is claimed is:

1. A lithium secondary battery comprising:
a cathode including a cathode active material;
an anode; and
an electrolyte disposed between the cathode and the anode,
wherein the cathode active material has a charge cut-off voltage of about 4.2 Volts to about 10 Volts with respect to a lithium counter electrode, and
wherein the electrolyte comprises an organic fluorinated ether compound, an organic solvent, a lithium salt, and an additive to form a solid electrolyte interface membrane, wherein the organic fluorinated ether compound is represented by Formulae 2 to 14

Formula 2
$R_{11}$—$CF_2$—$CH_2$—O—CFH—CFH—$R_{12}$
Formula 3
$R_{11}$—CFH—$CH_2$—O—CFH—$CF_2$—$R_{12}$
Formula 4
$R_{11}$—$CF_2$—$CH_2$—O—CFH—$CF_2$—$R_{12}$
Formula 5
$CF_3$—$CH_2$—O—CFH—CFH—$R_{12}$
Formula 6
$R_{11}$—$CF_2$—$CH_2$—O—CFH—$CF_3$
Formula 7
$CF_3$—$CH_2$—O—CFH—$CF_2$—$R_{12}$
Formula 8
$R_{21}$—$CH_2$—O—$CF_2$—CFH—$R_{12}$
Formula 9
$R_{21}$—$CH_2$—O—$CF_2$—$CF_2$—$R_{12}$
Formula 10
$R_{11}$—CFH—$CH_2$—O—$CF_2$—$R_{22}$
Formula 11
$R_{11}$—$CF_2$—$CH_2$—O—$CF_2$—$R_{22}$
Formula 12
$R_{21}$—CFH—O—CFH—$R_{22}$
Formula 13
$R_{21}$—CFH—O—$CF_2$—$R_{22}$
Formula 14
$R_{21}$—$CF_2$—O—$CF_2$—$R_{22}$ wherein, in Formulae 2 to 7, 12, and 13,
$R_{11}$ is hydrogen, fluorine, a C1-C8 alkyl group, a C3-C8 cycloalkyl group, a C1-C8 fluorinated alkyl group, or a C3-C8 fluorinated cycloalkyl group;
$R_{21}$ is hydrogen, fluorine, a C1-C9 alkyl group, a C3-C9 cycloalkyl group, a C1-C9 fluorinated alkyl group, or a C3-C9 fluorinated cycloalkyl group;
$R_{12}$ is hydrogen, fluorine, a C1-C9 alkyl group, a C3-C9 cycloalkyl group, a C1-C9 fluorinated alkyl group, or a C3-C9 fluorinated cycloalkyl group; and
$R_{22}$ is hydrogen, fluorine, a C1-C10 alkyl group, a C3-C10 cycloalkyl group, a C1-C10 fluorinated alkyl group, or a C3-C10 fluorinated cycloalkyl group,
wherein in Formula 8,
$R_{21}$ is hydrogen, fluorine, a C1-C9 alkyl group, a C3-C9 cycloalkyl group, a C3-C9 fluorinated alkyl group, or a C3-C9 fluorinated cycloalkyl group; and
$R_{12}$ is hydrogen, a C1-C9 alkyl group, a C3-C9 cycloalkyl group, a C2-C9 fluorinated alkyl group, or a C3-C9 fluorinated cycloalkyl group;
wherein in Formula 9,
$R_{21}$ is fluorine, a C1-C9 alkyl group, a C3-C9 cycloalkyl group, a C1-C9 fluorinated alkyl group, or a C3-C9 fluorinated cycloalkyl group; and
$R_{12}$ is fluorine, a C1-C9 alkyl group, a C3-C9 cycloalkyl group, a C1-C9 fluorinated alkyl group, or a C3-C9 fluorinated cycloalkyl group;

wherein in Formula 10, $R_{11}$ is hydrogen, a C1-C8 alkyl group, a C3-C8 cycloalkyl group, a C1-C8 fluorinated alkyl group, or a C3-C8 fluorinated cycloalkyl group; and $R_{22}$ is hydrogen, fluorine, a C1-C10 alkyl group, a C3-C10 cycloalkyl group, a C1-C10 fluorinated alkyl group, or a C3-C10 fluorinated cycloalkyl group;

wherein in Formula 11, $R_{11}$ is hydrogen, fluorine, a C1-C8 alkyl group, a C3-C8 cycloalkyl group, a C3-C8 fluorinated alkyl group, or a C3-C8 fluorinated cycloalkyl group; and $R_{22}$ is hydrogen, a C1-C10 alkyl group, a C3-C10 cycloalkyl group, a C4-C10 fluorinated alkyl group, or a C3-C10 fluorinated cycloalkyl group; and wherein in Formula 14, $R_{21}$ is hydrogen, fluorine, a C1-C9 alkyl group, a C3-C9 cycloalkyl group, a C2-C9 fluorinated alkyl group, or a C3-C9 fluorinated cycloalkyl group; and $R_{22}$ is hydrogen, fluorine, a C1-C10 alkyl group, a C3-C10 cycloalkyl group, a C3-C10 fluorinated alkyl group, or a C3-C10 fluorinated cycloalkyl group, wherein the organic solvent comprises an ether solvent, an ester solvent, an amide solvent, a linear carbonate solvent, a cyclic carbonate solvent, or a combination thereof, wherein an anion of the lithium salt is $F^-$, $Cl^-$, $Br^-$, $I^-$, $NO_3^-$, $N(CN)_2^-$, $BF_4^-$, $ClO_4^-$, $PF_6^-$, $(CF_3)_2PF_4^-$, $(CF_3)_3PF_3^-$, $(CF_3)_4PF_2^-$, $(CF_3)_5PF^-$, $(CF_3)_6P^-$, $CF_3SO_3^-$, $CF_3CF_2SO_3^-$, $CF_3CF_2(CF_3)_2CO^-$, $(CF_3SO_2)_2N^-$, $(FSO_2)_2N^-$, $(CF_3SO_2)_2CH^-$, $(SF_5)_3C^-$, $(CF_3SO_2)_3C^-$, $CF_3(CF_2)_7SO_3^-$, $CF_3CO_2^-$, $CH_3CO_2^-$, $SCN^-$, $(CF_3CF_2SO_2)_2N^-$, or a combination thereof, and wherein the additive to form a solid electrolyte interface membrane is vinylene carbonate, vinyl ethylene carbonate, fluoroethylene carbonate, a cyclic sulfite, a saturated sultone, an unsaturated sultone, an acyclic sulfone, or a combination thereof.

2. The lithium secondary battery of claim 1, wherein the organic fluorinated ether compound has a boiling point of about 60° C. to about 200° C.

3. The lithium secondary battery of claim 1, wherein the amount of the organic fluorinated ether compound is from about 5 percent by weight to about 70 percent by weight based on a total weight of the electrolyte.

4. The lithium secondary battery of claim 1, wherein the cathode active material has a charge cut-off voltage of about 5.5 Volts to about 10 Volts, with respect to lithium (Li) counter electrode.

5. The lithium secondary battery of claim 1, wherein the cathode active material comprises $Li_{1.2}Ni_{0.13}Co_{0.13}Mn_{0.54}O_2$.

6. The electrolyte of claim 1, wherein a concentration of the lithium salt may be from about 0.6 moles per liter to about 2.0 moles per liter.

7. The lithium secondary battery of claim 1, further comprising a film disposed on a surface of the anode, wherein the film comprises an organic fluorinated ether compound represented by Formulae 2 to 14.

* * * * *